United States Patent [19]

Matsushima et al.

[11] Patent Number: 5,786,105
[45] Date of Patent: Jul. 28, 1998

[54] SOLID OXIDE FUEL CELL

[75] Inventors: Toshio Matsushima, Sayama; Daisuke Ikeda, Tokorozawa; Himeko Kanagawa, Tokyo, all of Japan

[73] Assignee: Nippon Telegraph and Telephone Public Corporation, Tokyo, Japan

[21] Appl. No.: 686,530

[22] Filed: Jul. 26, 1996

[30] Foreign Application Priority Data

Jul. 28, 1995 [JP] Japan .................... 7-212364

[51] Int. Cl.⁶ .................... H01M 8/04; H01M 8/12
[52] U.S. Cl. .................... 429/34; 429/30; 429/33
[58] Field of Search .................... 429/30, 33, 34, 429/32

[56] References Cited

U.S. PATENT DOCUMENTS

| | | | |
|---|---|---|---|
| 4,686,158 | 8/1987 | Nishi et al. | 429/33 |
| 5,185,219 | 2/1993 | Ishihara et al. | 429/30 |
| 5,292,599 | 3/1994 | Soma et al. | 429/30 |
| 5,405,712 | 4/1995 | Yoshimura et al. | 429/38 |
| 5,549,983 | 8/1996 | Yamanis | 429/34 |

FOREIGN PATENT DOCUMENTS

| | | |
|---|---|---|
| 0442743 | 8/1991 | European Pat. Off. . |
| 3-238761 | 10/1991 | Japan . |
| 168729 | 6/1994 | Japan . |
| 6-196196 | 7/1994 | Japan . |
| 6-338336 | 12/1994 | Japan . |
| 07006776A | 1/1995 | Japan . |

Primary Examiner—Stephen Kalafut
Assistant Examiner—Carol Chaney
Attorney, Agent, or Firm—Spencer & Frank

[57] ABSTRACT

A solid oxide fuel cell which includes a substrate having therein a plurality of gas supply passages and a plurality of gas return passages. The gas supply passages have inlet ports on a surface of the substrate and the gas return passages have outlet ports on the same surface of the substrate. A header is interposed between the gas supply and gas return passages so that gas enters the header from the gas supply passages and then enters the gas return passages. The flow rate of the gas in the gas supply passages is less than the flow rate of the gas in the gas return passages. A solid electrolyte is formed on a first surface of the substrate, an electrode is formed on the solid electrolyte, and an interconnector is formed on a second surface of the substrate.

12 Claims, 15 Drawing Sheets

GAS TEMPERATURE

CURRENT DENSITY AT POWER GENERATION PORTION

SOLID OXIDE FUEL CELL

BACKGROUND OF THE INVENTION

1. Field of the Invention

This invention relates to the structure of a power generation cell of a solid oxide fuel cell and a method of making such cell.

2. Description of Related Art

In general, a solid oxide fuel cell (hereinafter referred to as an "SOFC") basically has a structure which consists of an electrolyte having selective permeability to oxide ions, an air electrode and a fuel electrode. The electrolyte is disposed between the air electrode and the fuel electrode, and the individual electrodes are supplied with a gas containing oxygen or hydrogen to generate power. Of these, the solid oxide electrolyte is required to be a dense sintered body which is superior in permeability to only oxide ions but which is not permeable to the gas.

As a material of the electrolyte, yttria-stabilized zirconia (hereinafter referred to as "YSZ") is used which has superior permeability to oxygen ions. On the other hand, of the two electrodes, the fuel electrode is composed of a cermet of nickel (or nickel oxide) with YSZ, and the air electrode is composed of a $LaSrMnO_3$ based substance as an electrically-conductive composite oxide having a perovskite type structure. Specifically, one of the points to be noted when the cell is constructed from such materials is the conductivity of the individual components. Conductivities of the three components are approximately 1000; 100, and 0.1 $(ohm-cm)^{-1}$, respectively in the decreasing order of the fuel electrode, the air electrode, and the electrolyte. Of these, since the electrolyte is particularly low in conductivity, it is basically desired that the electrolyte be in the form of as thin a film as possible to improve the power generation characteristics of the fuel cell. However, when a cell is formed, the method of producing a single cell and the connection of a plurality of cells should be sufficiently taken into consideration. As a result, a variety of structures are presently available for cell production.

FIG. 7A and FIG. 7B show examples of the cell structures of conventional SOFCs produced in the past. FIG. 7A shows a flat plate type cell 77 in which an electrolyte 71 is sandwiched between a fuel electrode 72 and an air electrode 73. The electrolyte 71 has a thickness of 300–500 μm, the electrodes 72 and 73 have thicknesses of up to 100 μm, and the entire cell has a thickness of about 500–700 μm. The numeral 74 indicates an interconnector, and 75 is a fuel gas passage, and 76 is an oxidant gas passage.

Incidentally, to obtain such a thin three-layer structured sintered body is difficult in itself, but even if the single cell 77 can be formed, because the electrolyte 71 must be thick in order to obtain a strength sufficient to withstand stacking for the connection of a plurality of power generation cells, this portion has a high resistive loss, which adversely affects the cell characteristics. Further, in a power generation system of an SOFC, such single cells has to be electrically connected in series. For this purpose, the single cells must be such that they can be piled on top of each other by using connection parts having gas supply grooves. However, because the mechanical strength of such a thin film-structured cell is not high enough to withstand such stacking, it is not advisable when stacking to exert large forces on the single cells. As a result, the contact resistance between the single cells increases, and the cell performance is not always sufficient. Further, gas sealing is essential at four sides of the cells, and it is difficult to assure sufficient sealability. Therefore, the conventional method is not sufficiently suited for the construction of a power generation system having a practical capacity.

As an alternative, a method is considered which uses a porous inactive substance as a cell support. FIG. 7B is a partially enlarged illustration showing an example of a tubular type cell using this method. This cell 77' has a structure in which an air electrode 73', an electrolyte 71', and a fuel electrode 72' are wound in this order on the outer periphery of a support tube 78 having a hollow part as an oxidant gas passage 76'. A fuel gas passage 75' is disposed on the periphery of the cell 77'. The numeral 74' indicates the interconnector.

In this cell, since the power generating portion is formed on the surface of the substrate, the electrolyte can be substantially thin, which, as described above, meets the requirement of an SOFC cell that the electrolyte film be thin. Further, since the cell is supported by the support tube 78, it has a high strength and stacking is easy. However, in this cell, as a problem inherent in the shape of the cell, since current during power generation flows along the fuel electrode layer, there is a large voltage drop in this portion of the power generation cell, and high power generation characteristics are not achieved.

To reduce the voltage drop due to current flow along the fuel electrode layer occurring in a tubular type cell, a method has been proposed which uses a hollow flat plate-formed porous electrode as a cell substrate. FIG. 7C, where 1' is a hollow electrode substrate, 2' is a solid thin film electrolyte, 31 is a second electrode, 4' is an interconnector, and 6' is a gas supply passage and 71 is a gas return passage within the electrode substrate 1', shows a cell of this type (Japanese Patent Application Laid-Open No. 168729/1994). In a cell of this type, first, since the thin film electrolyte 2' can be formed as in the tubular type cell 77' shown in FIG. 7B, and, further, since the cell substrate 1' comprises a porous electrode having conductivity, the current during power generation flows perpendicular to the cell, and power generation characteristics which are better than those obtained with the tubular type can be expected. However, in the single cell 5' of FIG. 7C, the gas flow passages provided in the electrode substrate 1' are formed in two stages. Gas is supplied to the gas supply passages 6' where it is preheated as it passes therethrough, turned back at an innermost portion of the substrate, and reaches the gas return passages 7' immediately beneath a power generation portion of the single cell 5' where a reaction takes place. As described above, since the gas is preheated in the supply passages 6', a longer dwell time in the supply passages is advantageous to achieve sufficient preheating. However, from the shape of the gas flow passages shown in FIG. 7C, it can be seen that the supply passages 6' and the discharge passages 7' have the same cross-sectional form, and therefore the flow rates of the gas supplied to each of the individual passages is the same. Therefore, gas preheat is insufficient only in the supply passages 6', preheat being continued after the gas passes through the portion of the substrate where the direction of gas flow is reversed and after reaching the discharge passages 7' where the power generation reaction should occur. As a result, a predetermined temperature is attained in the discharge passages 7', decreasing the surface area of the power generation portion effectively acting upon the power generation reaction, resulting in a reduced amount of power generation reaction as a whole.

As described above, a cell having sufficient power generation characteristics has not been achieved with a cell of the prior art structure.

SUMMARY OF THE INVENTION

The present invention relates to a self supporting film type SOFC which uses a hollow flat plate type substrate as a cell substrate comprising the electrode material and having therein gas flow passages. A primary object of the present invention is to improve thin film formation of the electrolyte and gas sealability and easily achieve a high performance SOFC.

The present invention provides a solid oxide fuel cell comprising an electrode, a solid electrolyte, and an interconnector, wherein a single cell comprises the electrolyte formed on a first main surface of a cell substrate formed of a first electrode material, a second electrode is formed on top of the electrolyte, and the interconnector is formed on a second main surface differing from the surface formed with the electrolyte. The cell substrate is porous, flat-formed, and has therein a plurality of flow passages of the gas corresponding to the first electrode material. The flow passages of the gas are formed in multiple rows in the substrate and comprise a plurality of gas supply passages and a plurality of gas return passages which communicate with each other at a gas turn around end portion, or header, in the substrate. In the gas turn around end portion, or header, gas entering from the gas supply passages is reversed in direction and directed into the gas return passages. Inlets to the gas supply passages and outlets from the gas return passages are located on a side surface of the substrate.

Here, the gas flow passages provided in the cell substrate may have a structure such that the flow rate in the gas supply passages is slower than the flow rate of the gas in the gas return passages.

The total cross sectional area of the gas supply passages provided in the cell substrate may be larger than the total cross sectional area of the return passages.

When the supply passages and the return passages have the same cross sectional area, the number of gas supply passages may be greater than the number of gas return passages.

Small holes communicating the individual flow passages may be provided in a partition wall between the gas supply passages and the gas return passages.

Each single cell may be mounted in the state of face to face contact in series through a material having a gas permeability and a conductivity and, in this state, encased in a shell having a gas supply chamber for supplying gas to the supply passages in the cell substrate, a discharge chamber of the gas returned from the return passages, and a power generation chamber supplied with the gas corresponding to the second electrode. Of the gas flow passages, the supply passages may be opened to the gas supply chamber, the return passages may be opened to the gas discharge chamber, and the single cell unit may be disposed in the power generation chamber supplied with the gas corresponding to the second electrode.

$(La_{1-x}Sr_x)yMnO_3$ may be used as the first electrode material constituting the cell substrate, nickel zirconia cermet as the second electrode material, and a zirconium oxide doped with yttrium oxide as the electrolyte.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

Figure 1A:
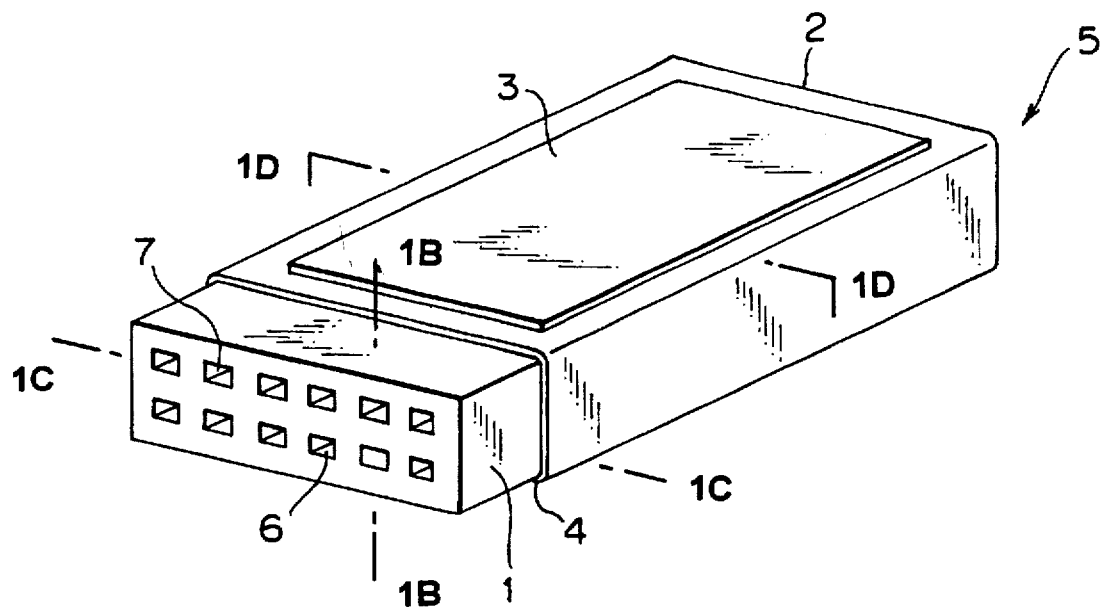
FIG. 1A is a schematic perspective illustration of a single fuel cell of a first embodiment of the present invention.

A major feature of the SOFC of the present invention is that a hollow flat plate type substrate (or air electrode) is provided which contains a plurality of supply passages used for the supply of a gas to the substrate and a plurality of discharge passages for discharge of the gas from the substrate. On the surface of the substrate are formed layers of an electrolyte and other electrodes. Heretofore, there has been known a type of SOFC in which a tubular pipe comprising an inactive substance is used as a support tube, and an electrolyte and electrodes are formed on the surface thereof. There has also been known a type of SOFC in which three flat layers are combined to form a flat plate type cell. However, there has not been known a fuel cell comprising a cell substrate in which a plurality of gas supply and return passages are provided in the substrate, as in the present invention, wherein the openings or ports to the gas supply and return passages are disposed in the same plane on one side of the substrate. Further, another feature of the cell is that the gas supply and discharge ports of the substrate are disposed on the same side surface thereof. As a result, when a stack of single cells is formed, the substrate is mounted so that only the side where the openings are present is gas sealed, and the gases flowing inside and outside the substrate can be separated. Heretofore, there has not been present a single cell or a fuel cell using the cell structure or gas supply system of the present invention.

In the present invention, a plurality of multi-row gas supply and gas return passages are provided within a hollow flat porous electrode for gas supply and discharge. The gas flow rate in the gas supply passages is lower than the gas flow rate in the return passages when the sectional shapes of the supply and return passages are the same and a greater number of rows are used for the supply passages than for the return passages. When the number of supply passages is equal to the number of return passages, the sectional areas of the supply passages are made larger than that of the return passages. This allows sufficient preheating of the gas in the supply passages and, after passing through a gas turn back section interposed between the gas supply passages and return passages, a supply of sufficiently preheated gas is provided to the return passages.

Further, by reducing the gas flow rate in the supply passages, some of the gas can be diffused in the porous sintered body of the substrate and supplied to the return passages to generate power, thereby achieving a uniform power generation reaction throughout the entire substrate in conjunction with the power generation reaction occurring after the turn back portion of the return passages.

Still further, to promote gas diffusion between the supply and return passages, small holes are provided which communicate between the individual passages in a partition wall between the gas supply and return passages. This further enhances the effect of uniformization of power generation reaction by the partial diffusion of the gas in the substrate.

EMBODIMENTS

Figure 1B:
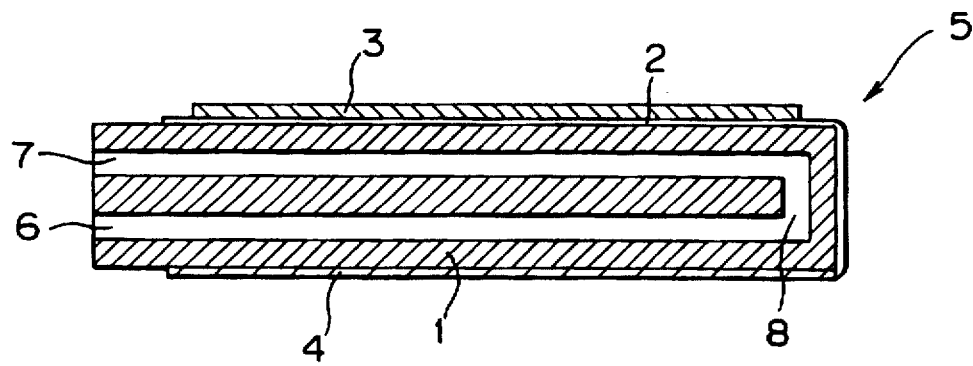
FIG. 1B is a schematic cross sectional view taken along the line 1B–1B of the single fuel cell of the first embodiment of the present invention shown in FIG. 1A.
Figure 1C:
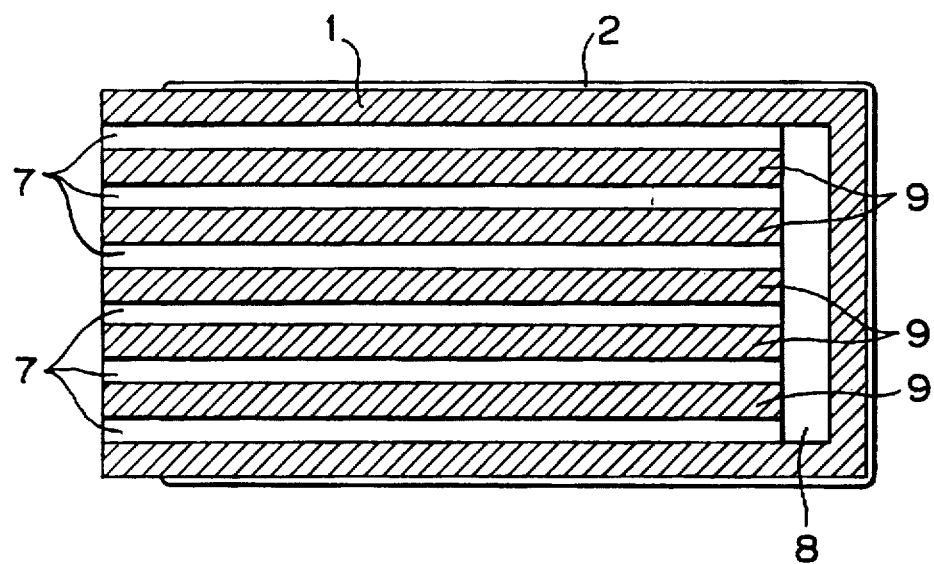
FIG. 1C is a schematic cross sectional view taken along the line 1C–1C of the single fuel cell of the first embodiment of the present invention shown in FIG. 1A.
Figure 1D:
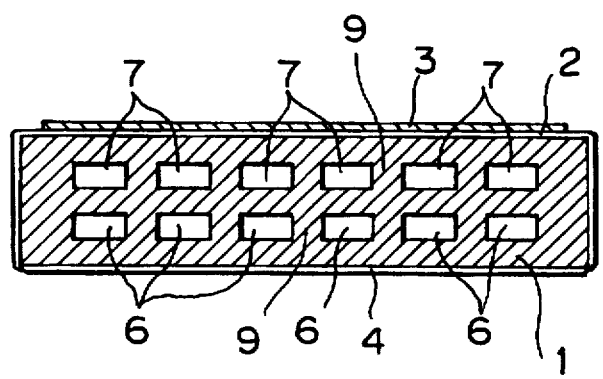
FIG. 1D is a schematic cross sectional view taken along the line 1D–1D of the single fuel cell of the first embodiment of the present invention shown in FIG. 1A.

FIGS. 1A, 1B, 1C and 1D show a first embodiment of the structure of a single cell 5 of a solid oxide fuel cell according to the present invention, of which FIG. 1A is a perspective view, FIG. 1B is a cross sectional view taken along the line 1B–1B of FIG. 1A, FIG. 1C is a cross sectional view taken along the line 1C–1C of FIG. 1A, and FIG. 1D is a cross sectional view taken along the line 1D–1D of FIG. 1A. The single cell 5 of the present invention comprises a power generation portion in which individual layers of a solid oxide electrolyte 2 and a second electrode 3 are formed on one surface of an electrode substrate 1, and an interconnector 4 is provided on the side of the substrate 1 opposite the surface on which the power generation portion is formed. The materials of which the individual parts of the cell are made are described in detail hereinafter when the cell construction is described. However, here it will be said that the substrate (air electrode) is based on a LaSrMnO$_3$ composite oxide, the second electrode 3 is based on a nickel zirconia cermet, and the electrolyte 2 is based on YSZ. Further, the interconnector 4 is made of a LaCrO$_3$ based substance which is stable under an oxidation-reduction environment. Yet further, the numeral 6 indicates each of a plurality of gas supply passages, 7 indicates each of a plurality of gas return passages, 8 is a gas turn around end portion, or header, in the substrate interposed between the gas supply and gas return passages, and 9 is a support for supporting upper and lower parts of the substrate.

Figure 2A:
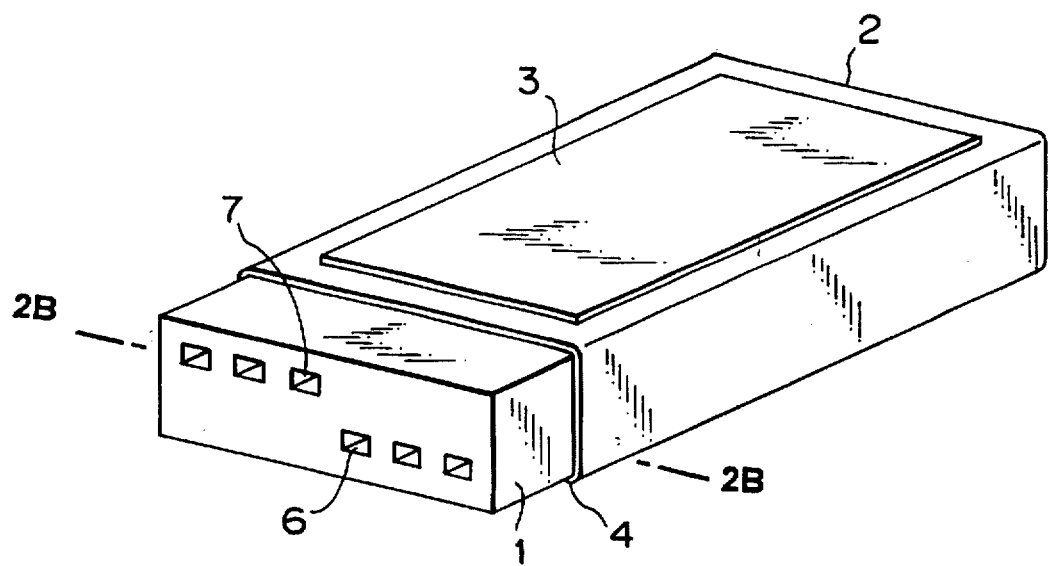
FIG. 2A is a schematic perspective illustration of a single fuel cell of a second embodiment of the present invention.
Figure 2B:
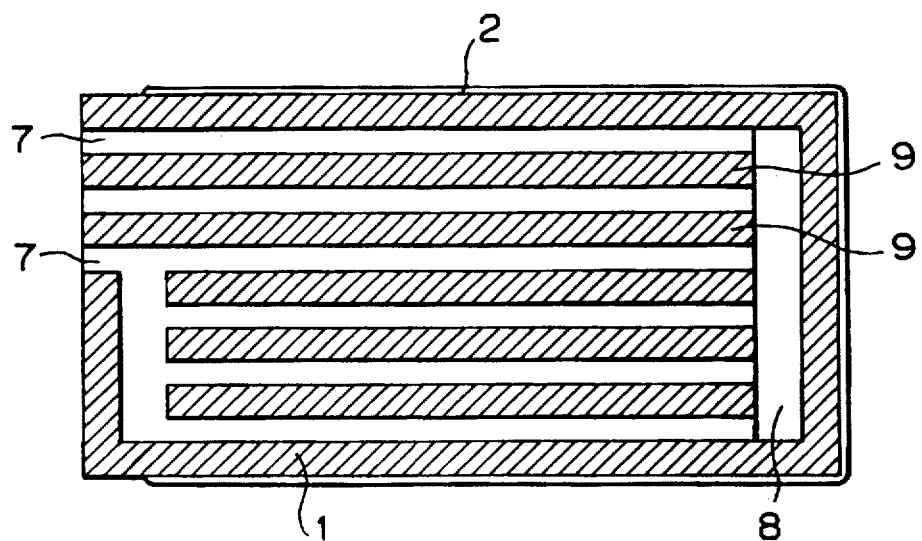
FIG. 2B is a schematic cross sectional view taken along the line 2B–2B of the single fuel cell of the second embodiment of the present invention shown in FIG. 2A.
Figure 3:
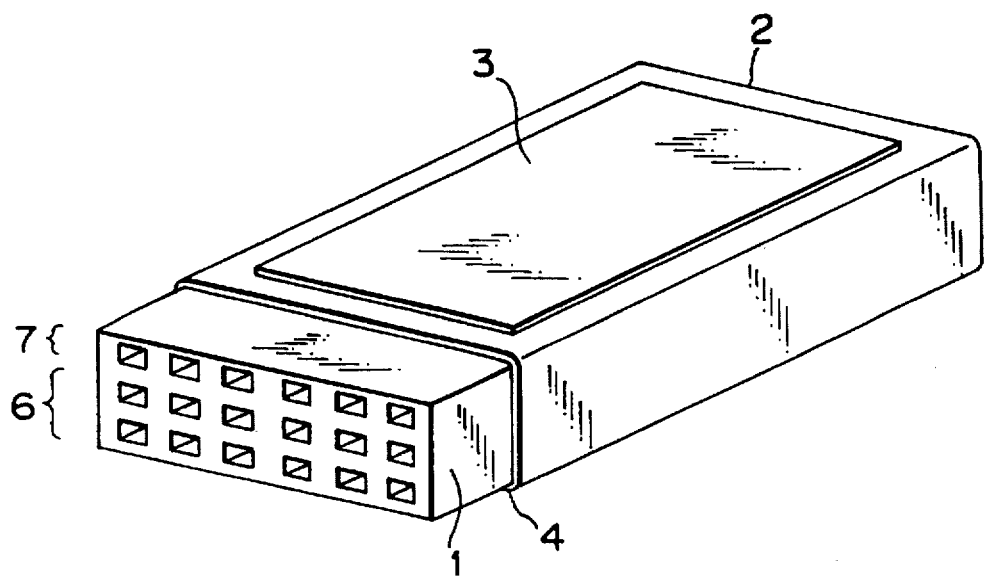
FIG. 3 is a schematic perspective illustration of a single fuel cell of a third embodiment of the present invention.

FIGS. 2A, 2B and 3 show other embodiments of a single cell of the solid oxide fuel cell according to the present invention. In the embodiment of FIGS. 2A and 2B, when a module is formed, the inlets of the gas supply passages 6 and the gas discharge passages 7 into the substrate are narrowed in order to enhance the gas separation effect at the supply ports of the gas supply passages 6 into the substrate and the discharge ports of the gas discharge passages 7. Further, in FIG. 3, the gas supply and return passages 6 and 7 are formed in three rows. That is, the lower two rows are used as the gas supply passages 6, and the upper row is used as the gas return or discharge passages 7. However, selection of the number of passages is flexible and, considering the gas preheating effect, the number of supply passages and return passages can be appropriately selected.

In the present invention, the single cell 5 is formed in this structure to ensure the cell strength. Therefore, the electrolyte may be as thin as several to several tens of μm, thereby substantially reducing the resistance of the electrolyte which is largely concerned with the cell performance. Further, the substrate is formed of an electrode material of high conductivity, is not simply hollow shaped, but is provided therein with a support. Therefore, since the current flows through the support of the substrate, the resistance can be prevented from increasing. As a result, even if the thickness of the hollow substrate is increased to about 1 cm, the decrease in resistance due to the thin film formation of the electrolyte is greater than the increase in the resistance of the substrate due to the increase in its thickness, which is not a problem in view of the entire cell. Further, the gases supplied to the individual electrodes are perfectly separated between the inside and outside of the electrode substrate. Cross leakage of the individual gases is positively prevented by providing a seal on one side of the cell.

Also, the individual passages within the substrate are supply and return passages, and since these passages communicate with each other within the substrate by means of the header interposed between the supply and return passages the gas is reversed in direction and supplied to the reaction section where it is preheated. In this case, the gas supply ports and the discharge ports are located on the same side surface of the substrate on respective parallel spaced lines. Therefore, separation of the individual gases can be effectively achieved by sealing the side surface where the gas supply ports and the gas discharge ports are located.

In the prior art flat plate type of SOFC, a self supporting type cell wherein the electrolyte itself is used as a pillar and is provided with two electrodes on the surface thereof, the thin film electrolyte must be made relatively thick to ensure the cell strength, and this relatively large thickness contributes to the resistance of the entire cell. Further, sealing is required on the four sides around the cell. However, the present invention does not present such a problem. Further, although the electrolyte can be in the form of a thin film in the prior art tubular type cell, the power generation current flows in the horizontal direction in the electrode layer, which results in an increase in resistance. However, with the cell according to the present invention, the current flows in the direction perpendicular to the electrode layer by using a hollow flat substrate, thereby preventing a specific current flow occurring in the tubular type of SOFC with no degradation of the power generation characteristics.

Next, the structure of a power generation module constructed by combining the thus produced single cells 5 will be described. FIGS. 4A, 4B, 4C, 4D and 4E show examples of the power generation module of the present invention. Here, a module using the single cells as shown in FIGS. 2A and 2B will be described.

Figure 4A:
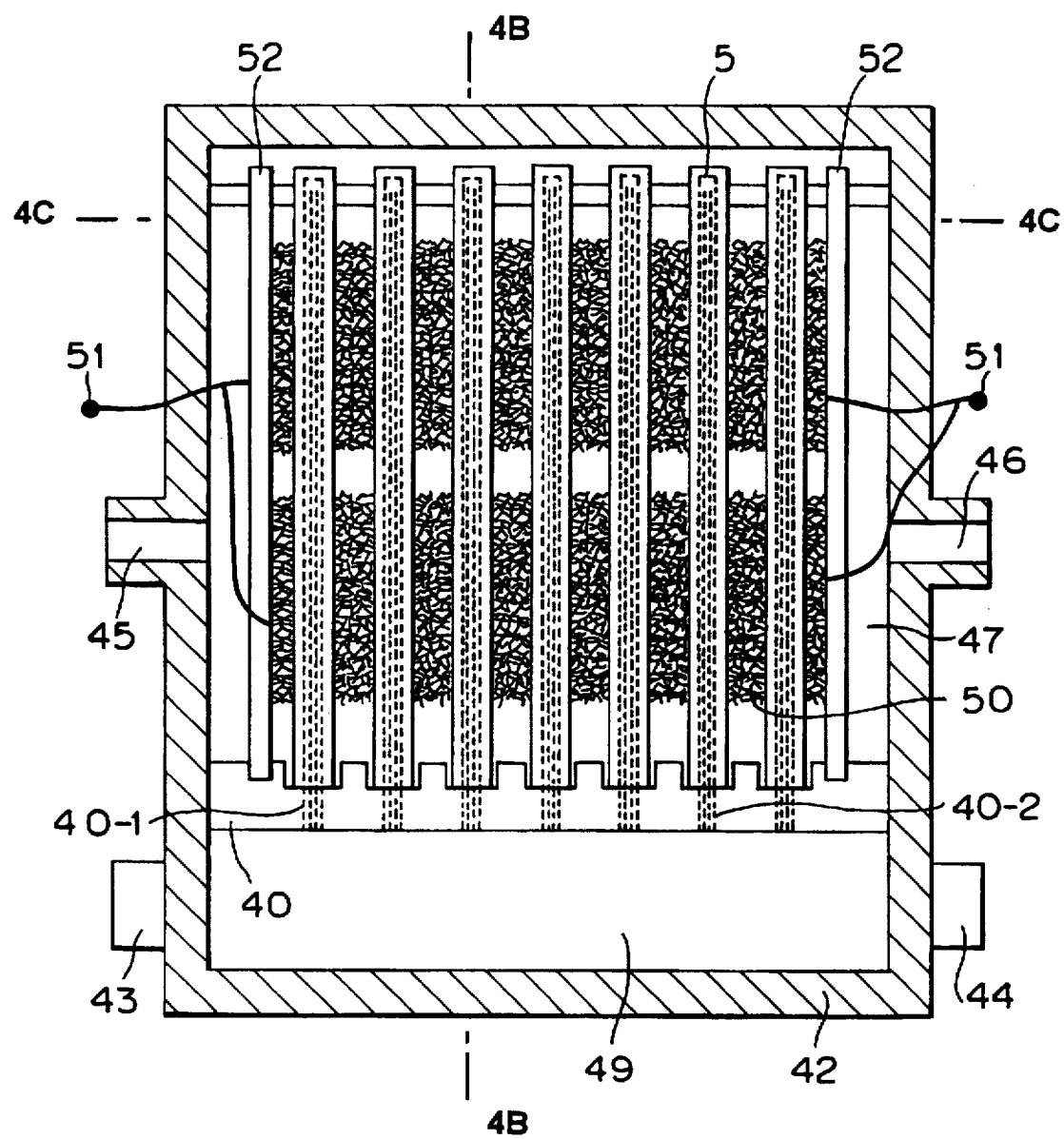
FIG. 4A is a schematic cross sectional view of a power generation module incorporating a plurality of single cells of the present invention.
Figure 4B:
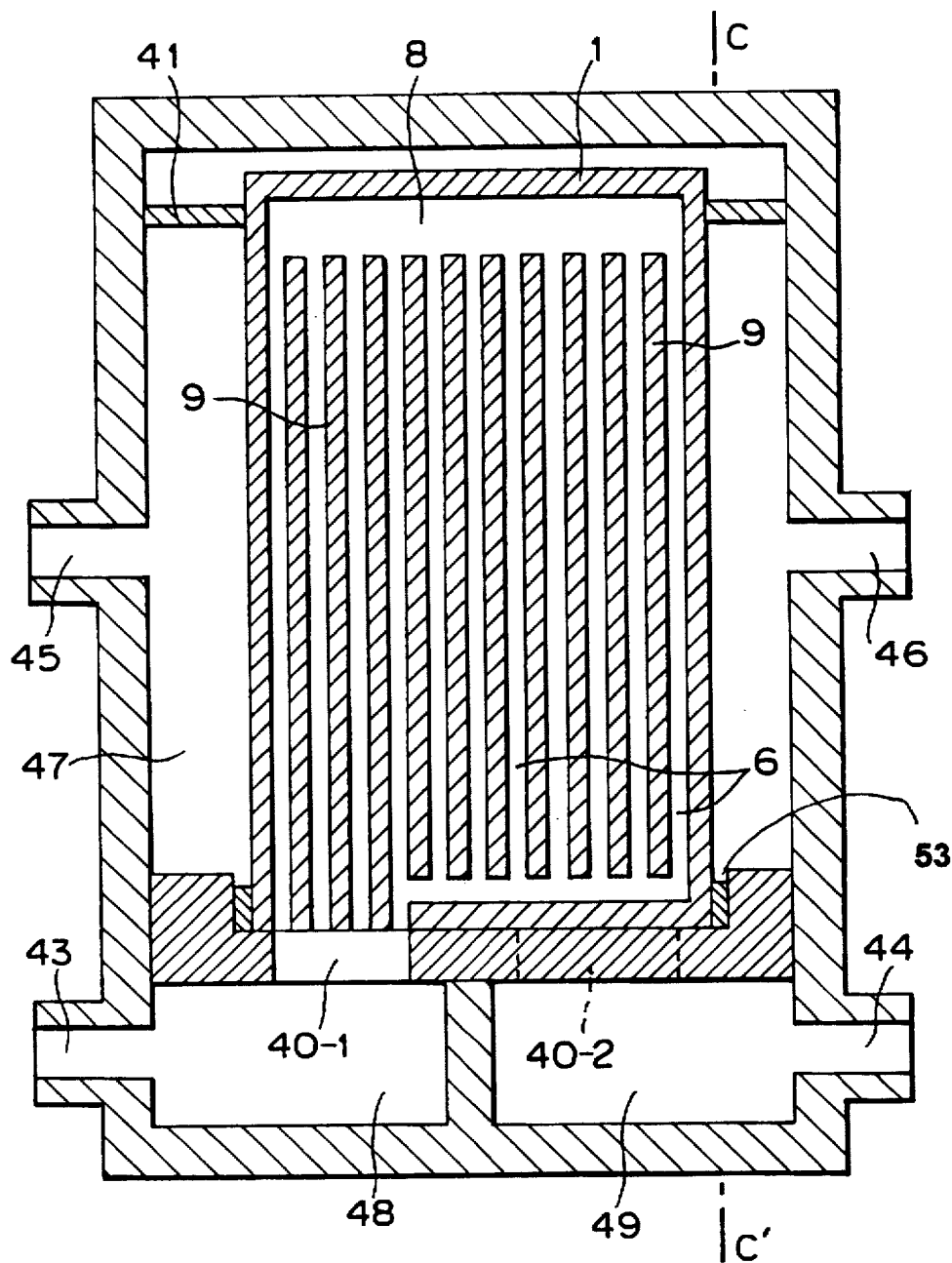
FIG. 4B is a schematic cross sectional view taken along the line 4B–4B of the power generation module of the present invention shown in FIG. 4A.
Figure 4C:
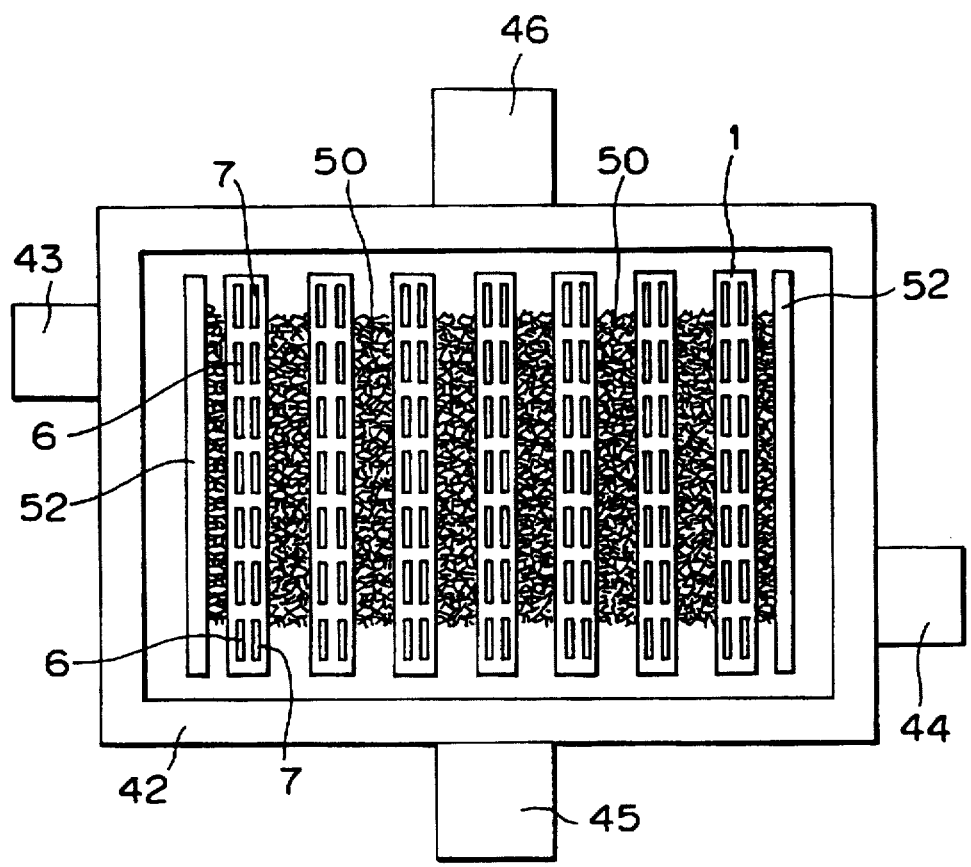
FIG. 4C is a schematic cross sectional view taken along the line 4C–4C of the power generation module of FIG. 4A.
Figure 4D:
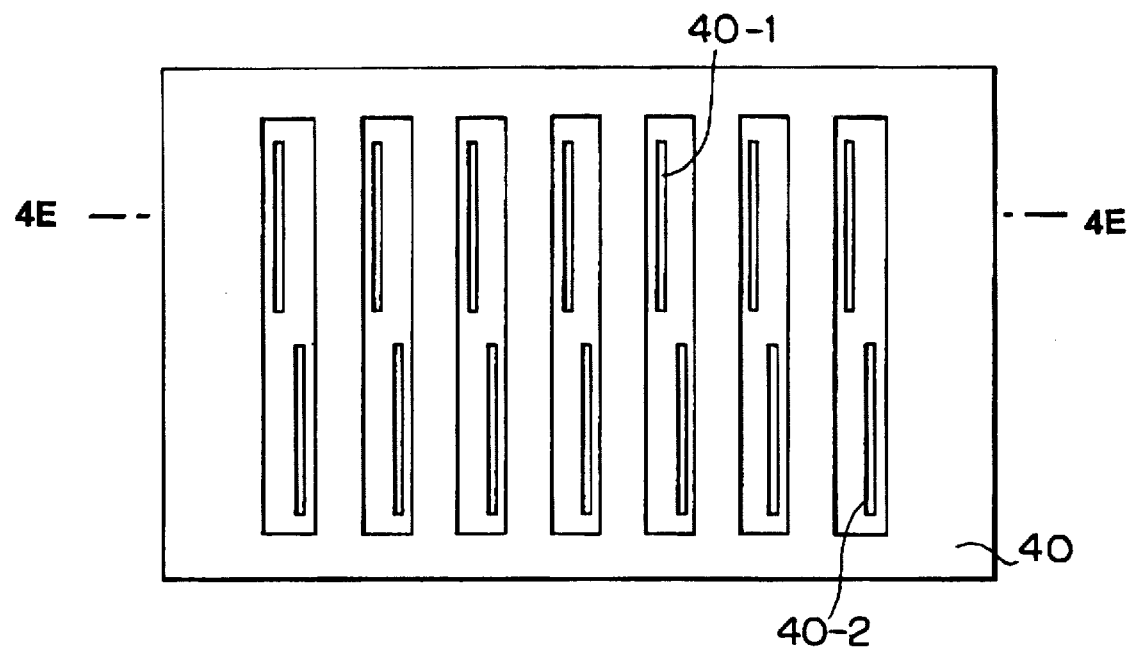
FIG. 4D is a plan view of a cell holding plate of the present invention.
Figure 4E:
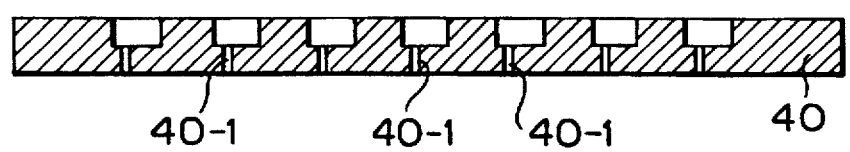
FIG. 4E is a schematic cross sectional view taken along the line 4E–4E of the cell holding plate of FIG. 4D.

In FIGS. 4A–4E, the numeral 40 indicates a cell holding plate, 40-1 is an oxidant gas supply slit, 40-2 is an oxidant gas discharge slit, 41 is a cell supporting plate, 42 is a shell, 43 is an oxidant gas supply port, 44 is an oxidant gas discharge port, 45 is a fuel gas supply port, 46 is a fuel gas discharge port, 47 is a power generation chamber, 48 is an oxidant gas supply chamber, 49 is an oxidant gas discharge chamber, 50 is a conductive spacer, 51 is a conductor, 52 is an end plate and 53 is a seal. The relative positions of the fuel gas supply port 45, the fuel gas discharge port 46, the oxidant gas supply port 43 and the oxidant gas discharge port 44 relative to the shell 42 are best shown by FIG. 4C for improved contact of the gas with the fuel electrode or the gas with the air electrode.

In constructing the module, the single cell 5 is positioned by the cell supporting plate 41 and the cell holding plate 40 and, in this state, encased in the shell 42. The cell holding plate 40 for holding the single cell 5 is provided with the oxidant gas supply slits 40-1 and the oxidant gas discharge slits 40-2 thereby supplying oxidant gas to the substrate and discharge of oxidant gas unused in the reaction. On the other hand, the fuel gas is supplied from the fuel gas supply port 45 to the power generation chamber 47, and unreacted fuel and water vapor as a reaction product are discharged from the fuel gas discharge port 46 to the outside. As shown in FIGS. 4A and 4C, conductive spacers 50 comprising a material which is superior in gas permeability such as nickel felt are disposed between the single cells, and the individual cells are assembled in a face-to-face contact configuration. Therefore, the individual cells are electrically connected in series, and the fuel gas can be efficiently supplied to the power generation section without hindering diffusion of the fuel gas between the individual cells to generate power.

Next, operation of the SOFC of the present invention will be described.

In the operation of the SOFC of the present invention, similar to the conventional SOFC, the power generation module is installed at a temperature of 900° to 1000° C., and the oxidant and fuel gases are supplied to the SOFC. The oxidant gas is supplied from the oxidant gas supply port 43, reaches and passes inside of each single cell 5 through the oxidant gas supply slits 40-1 and are preheated during flow through the oxidant gas supply passages. The oxidant gases then pass through the header 8 after which they reach the cell formation section where the reaction takes place, and then the residual oxidant gas reaches the oxidant gas discharge chamber 49. Therefore, of the gas passages provided in the substrate, the supply passages before the header 8 act as a gas preheating portion. On the other hand, the fuel gas is supplied from the fuel gas supply port 45 provided on the side surface of the shell 42 to the inside of the power generation chamber 47, where power generation is carried out. At this time, although the supplied fuel gas flows into gaps of the porous conductive spacers 50 disposed between the individual cells where it reacts, diffusion of the fuel gas to the electrodes is carried out without disturbance. Then, the fuel gas which is not consumed by the reaction in this portion is discharged from the fuel gas discharge ports 46 to the outside of the shell 42.

A major advantage of the module using the single cell of the above-described structure is that the supplied gas can be preheated within the substrate. That is, oxidant gas passes through supply passages 6, the header 8 and return passages 7 in the substrate. In the supply passages 6, no reaction takes place until the oxidant gas reaches the header 8. After passing through the header 8, the entire surface is supplied with the oxidant gas to start the reaction. Therefore, as in the gas supply method of the prior art flat plate type cell, since the gas supply to the entire surface of the cell is made simultaneously, the power generation reaction in the cell can be made uniform. Further, the gas before being used for power generation is preheated when it flows in the substrate. The gas absorbs heat at this time thereby preventing local heating in the substrate and positively contributing to a uniform temperature distribution in the module. On the other hand, when the gas supply and return passages are formed in the same portion of the substrate, the reaction takes place in the gas supply passages and the return passages. This occurs because the gas concentration in the individual passages is high only in the supply passages resulting in an unbalance in power generation which causes a distribution of temperature in the right and left portions of the substrate which may lead to damage to the substrate due to thermal stress. However, with the structure of the present invention, the occurrence of local heating and temperature distribution within the substrate can be prevented.

Figure 8A:
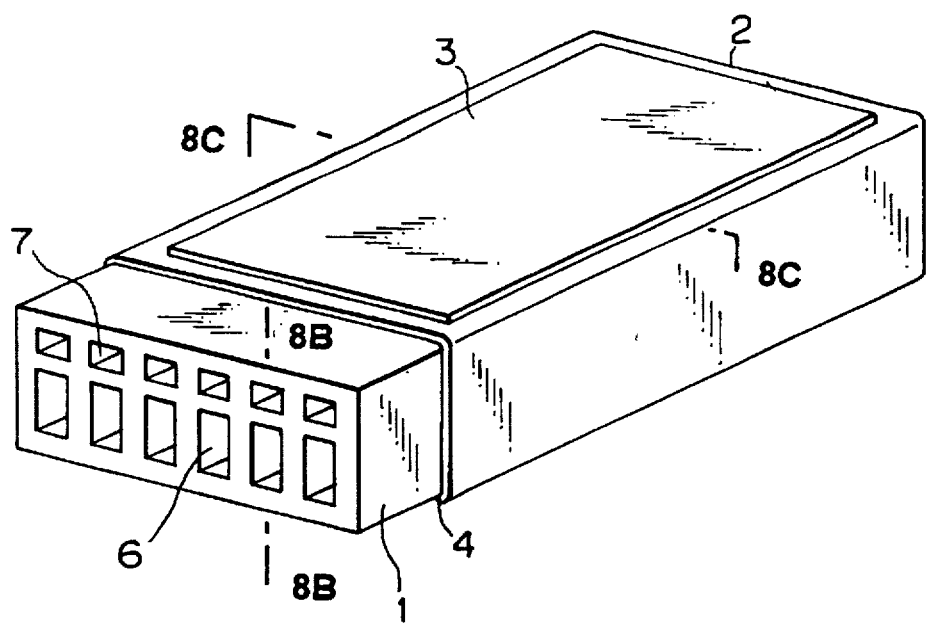
FIG. 8A is a schematic view showing the structure of a single fuel cell of a fourth embodiment of the present invention in which the gas supply passages have a larger cross sectional area than the return passages.
Figure 8B:
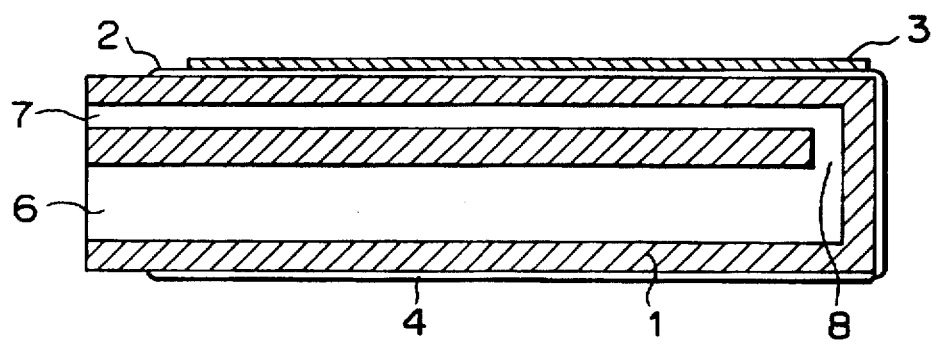
FIG. 8B is a schematic cross sectional view taken along the line 8B–8B of the single fuel cell of the fourth embodiment of the present invention shown in FIG. 8A.
Figure 8C:
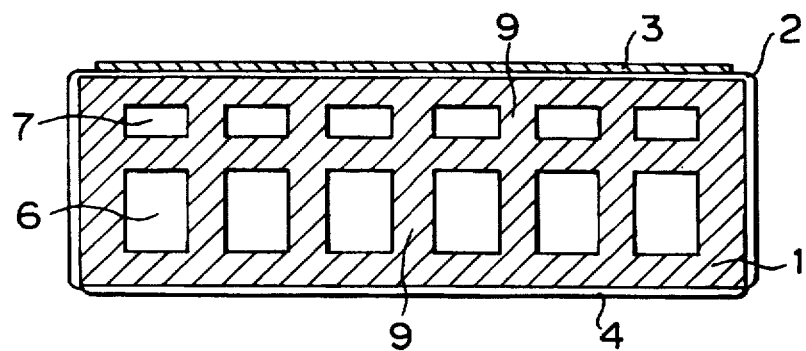
FIG. 8C is schematic cross sectional view taken along the line 8C–8C of a single fuel cell of the fourth embodiment of the present invention.

FIGS. 8A, 8B and 8C show the single cell cross sectional structure of another embodiment of the solid oxide fuel cell according to the present invention. FIGS. 8A, 8B and 8C show a case where the cross sectional areas of the supply passages are larger than those of the return passages, and the flow passages differ in shape between the supply passages and the return passages. An example where the individual passages have the same shape, and a plurality of gas passages comprise the supply passages is shown in FIG. 3.

Figure 9:
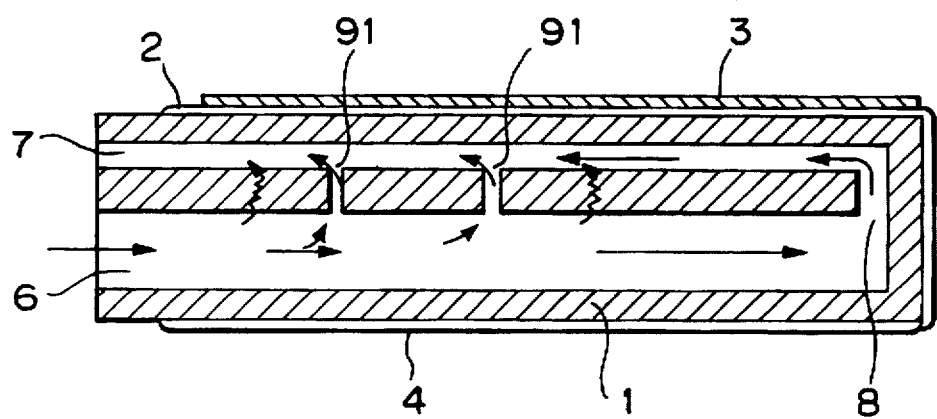
FIG. 9 is a schematic view showing gas flow and diffusion conditions in a single cell to which the present invention is applied.

FIG. 9 shows a cross sectional view taken parallel to the flow passages of the substrate shown in FIG. 8A. FIG. 9 illustrates oxidant gas flow in a passage and the gas diffusion condition in the substrate. As shown, the oxidant gas flows into the supply passage where it is preheated, reaches the return passage through the header 8 where it is reversed in direction and, at the same time, part of the gas partly diffuses to the return passage side to begin the reaction at that location. In addition, small holes 91 are provided in the partition between the supply passages and the return passages, thereby promoting gas diffusion from the supply passages to the return passages.

As described above, in the present invention, even when the passages have the same shape, the oxidant gases can be supplied to the entire surface of the substrate after it is passed through the header, thereby starting an efficient reaction. This is similar to the gas supply method of the prior art flat plate type cell. However, depending on the flow rate of the supplied oxidant gas, the power generation reaction rate is high at the portion of the substrate where the oxidant gas flows into the return passage. As a result, there may be a danger of local heating at this portion. However, with the substrate shown in FIG. 8A, the gas in the supply passages is sufficiently preheated, and gas diffusion partially takes place from the supply passages to the return passages to promote a power generation reaction thereby suppressing local heating in the substrate.

Figure 10A:
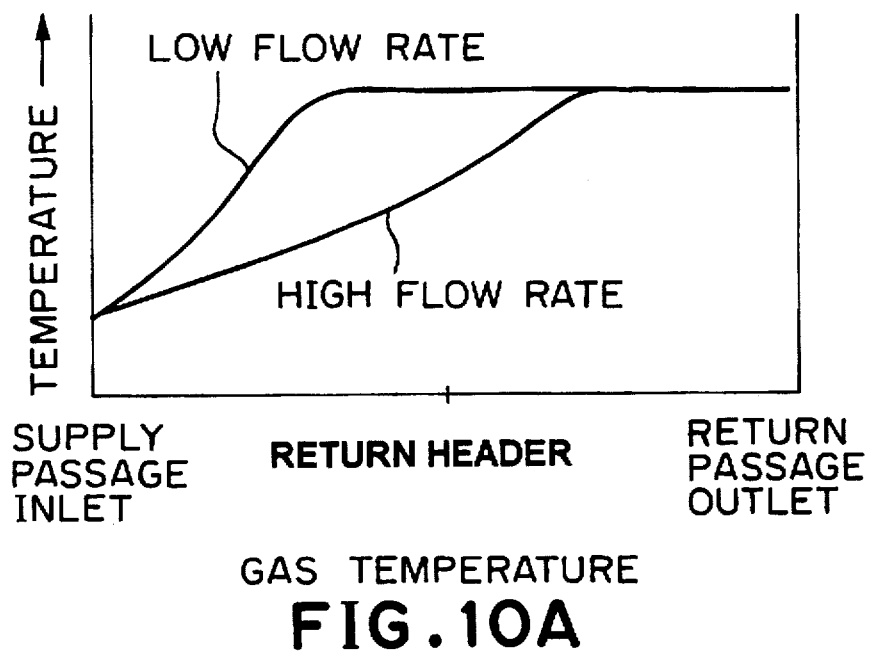
FIG. 10A is a graph showing a gas temperature rise in a single cell to which the present invention is applied.
Figure 10B:
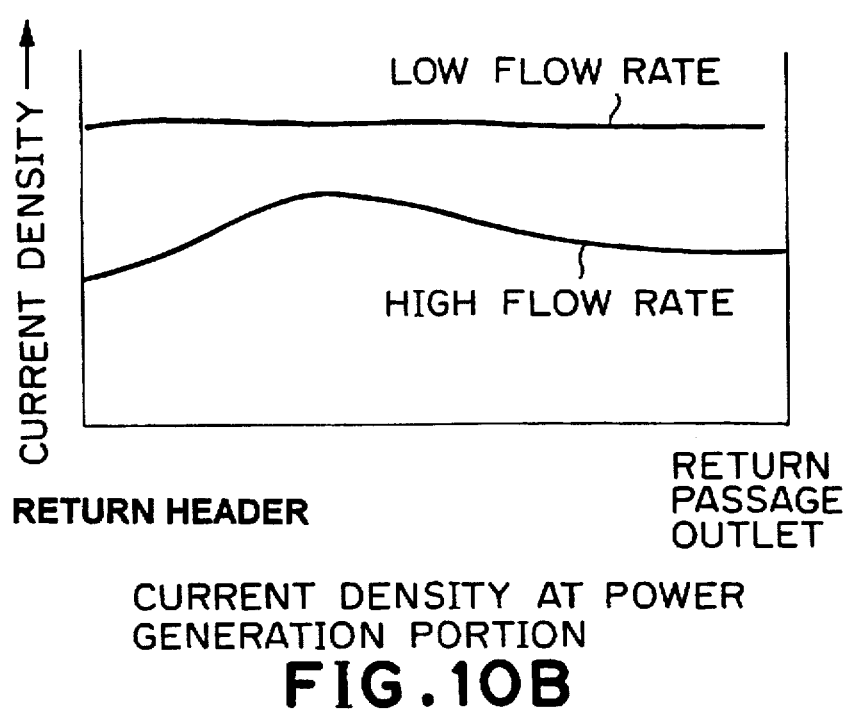
FIG. 10B is a graph showing the current density at a power generation portion in a single cell applied with the present invention.

FIG. 10A is a graph showing the increasing temperature of the oxidant gas as it flows from the supply passages to the return header to the return passages. FIG. 10B shows changes in the density of the current generated along the gas flow return passages on the surface of the power generation section as a function of the gas flow rate in the supply passages. It can be seen from FIGS. 10A and 10B that gas preheating is made sufficient by reducing the gas flow rate in the supply passages. Further, from the current density in the power generation section, it can be seen that the density of the current generated is in general high with a small bias in the distribution. On the other hand, when the gas flow rate in the supply passages is not reduced, an increase in the gas temperature is delayed, and preheating still occurs after the gas reaches the return passages, and the distribution of the current density generation becomes large. Further, the magnitude of the current generated is low as a whole and, as a result, the amount of total power generated is decreased.

Next, a detailed description will be provided of a method of constructing the single cell of the present invention. In the present invention, a substrate having therein gas passages is produced from electrode material, and on one side of the substrate an electrolyte and another electrode are formed. In this embodiment, a hollow substrate was first produced from the electrode material, then the electrolyte and the other electrode were formed thereon.

As an electrode material to form the substrate, $(La_{1-x}Sr_x)MnO_3$ having a perovskite structure was adopted which is generally used as an air electrode material of the SOFC, of which powders of $La_{0.8}Sr_{0.2}MnO_3$ and $La_{0.9}Sr_{0.1}MnO_3$ having a diameter 1–3 μm were used. The substrate is produced by an extrusion method, and the power generation cell was formed on the sintered body.

Figure 5A:
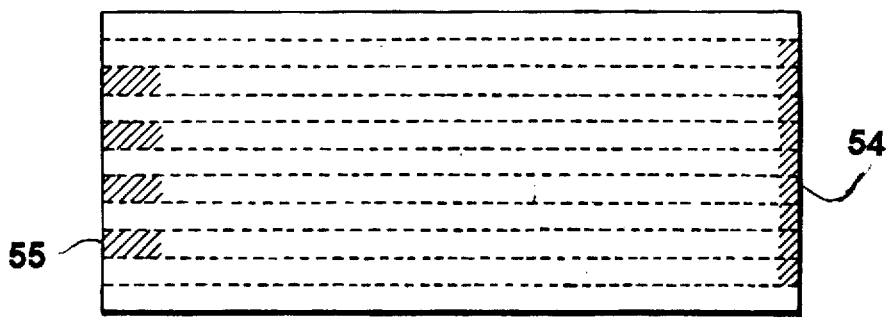
FIG. 5A is a schematic plan view showing a method of producing an electrode substrate of the present invention by an extrusion method.
Figure 5B:
FIG. 5B is a schematic side view showing a method of producing the electrode substrate of the present invention by an extrusion method.
Figure 5C:
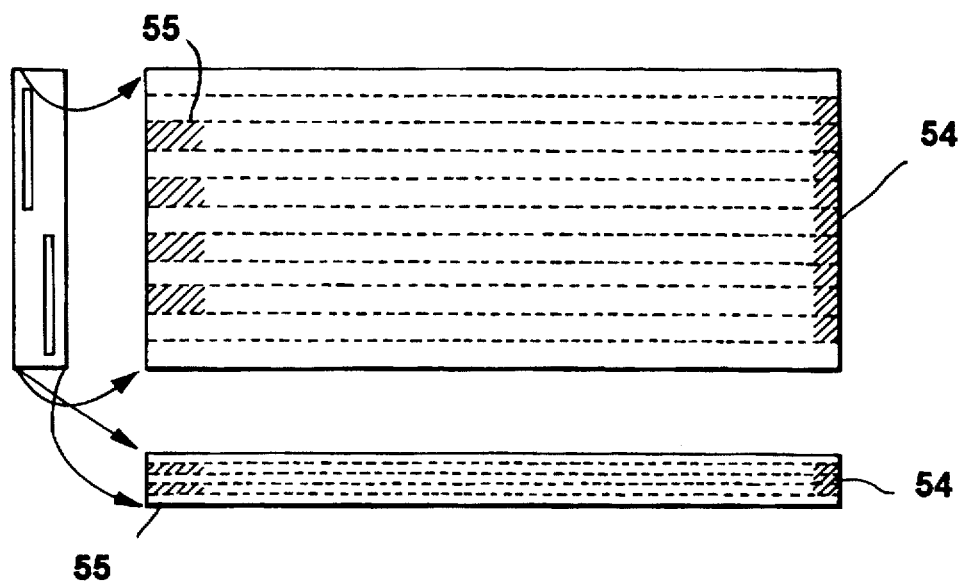
FIG. 5C is a schematic view showing a method of producing the electrode substrate of the present invention by an extrusion method.

Extrusion molding can be easily carried out by using a die having the same cross section as the cross section of the substrate. The thus produced mold was partially processed and then sintered to obtain the desired substrate. The partial processing is the same as that used for processing the portion corresponding to the tip 54 (FIGS. 5A–5C) and the inside of the base portion of the substrate 55. In the processing, as shown in FIGS. 5A, 5B and 5C, the inside of both the tip 54 and base of the substrate 55 was partially cut (the hatched parts in FIG. 5A to FIG. 5C), where a part comprising the same material was mounted to be integrated with the substrate (FIG. 5C).

Extrusion molding requires a clay material, and to obtain such a material, the raw material powder was mixed with the following additives in the ratio (by weight) shown below:

| Raw material powder | 100 |
| Binder | up to 5 |
| Plasticizer | 2–5 |
| Solvent | 10–15 |

As the binder, a methyl cellulose type water-soluble polymer (METOLOSE 60SH-4000 manufactured by Shin-Etsu Chemical) was used. In the extrusion process, finishing of the mold is largely affected by the viscosity of the material, for example, when the amount of water is low, the extrusion pressure becomes high, which may cause cracking during molding, or when the water content is high, it may become difficult to maintain the hollow structure. After trials as to the mixing ratio, it was possible to produce a satisfactory mold with the above-described mixing ratio.

In addition, drying of the water and burn out of the binder are required in the sintering of the extrusion molded body. After the mold was thoroughly dried, it was burned out at about 400° C. which temperature was selected according to the decomposition temperature of the binder. The molded body was sintered at 1250° to 1350° C. for up to 10 hours to produce an air electrode hollow substrate having an outer size of 70×150 (mm) and a thickness of up to 8 mm. Further, since the progress of sintering is affected by the particle size of the raw material powder used, the temperature and time was selected taking such influence into consideration. Thus, a sintered body with a porosity of 25 to 35% and a conductivity of about 100 $(ohm-cm)^{-1}$ at 1000° C. was obtained.

On the thus produced electrode substrate, an interconnector was formed by a plasma spray method. The spray machine used was of the air plasma spray type, and a $La_{0.9}Ca_{0.1}CrO_3$ powder was sprayed to form a film with a thickness of around 100 μm having a gas permeability on the order of $10^{-7}$ $(cc.cm/sec.(g/cm^2)$ $cm^2)$.

After that, the electrolyte and fuel electrode thin films were formed by an EVD method. As an EVD apparatus, an "electrochemical deposition apparatus" (Japanese Patent Application Laid-open No. 73546/1994) was used to form the films using yttrium chloride and zirconium chloride as raw materials at a temperature of 900° C. and a reaction pressure of 1 Torr. As the electrolyte, a composition of zirconium oxide mixed with 8 mol % of yttrium oxide to stabilize the crystal structure (YSZ) was used. The thickness of the film-formed YSZ was about 20 μm. Then, on the YSZ film, a fuel electrode was formed. To form the electrode, a nickel metal powder in the form of a slurry was coated on the YSZ film, and then subjected to EVD under the same conditions.

Next, an embodiment wherein the substrate and electrolyte/electrode films are formed simultaneously by a co-firing method will be described.

In the co-firing method, a sheet-formed mold of each material is formed by the doctor blade method, and these sheets are appropriately laminated and thermally fused to form a green body of the hollow substrate, which is then sintered. The doctor blade method requires a high-viscosity slurry, and the slurry was obtained by the following mixing ratio (by weight).

| Raw material powder | 100 |
| Binder | 10–15 |
| Plasticizer | 5–10 |
| Solvent | 200 |

As the binder, poly vinyl butyral was used, di-n-butyl phthalate was used as the plasticizer, and isopropyl alcohol was used as the solvent. The reason the amounts of the binder and the plasticizer have some ranges is that the particle size and surface area differ depending on the materials used, and the properties and shrinkage of the slurry become different and require appropriate adjustment. It is important in co-firing that the shrinkage of the green sheet of the subject material is made as uniform as possible, and for this purpose, the mixing ratio of the slurry is adjusted. After such a slurry was agitated by a ball mill for about 24 to 48 hours, it was deaerated under a vacuum to remove the solvent and adjust the viscosity, and then a sheet-formed mold was obtained by a doctor blade apparatus. Such sheets were cut to a predetermined size, and heat pressed under conditions of 70°–80° C. and 30–70 kg/cm² to produce a fused body of the sheets. The shape of each part of the hollow body could be flexibly modified to the desired shape by changing the shape or number of the sheets to be stacked.

Figure 6:
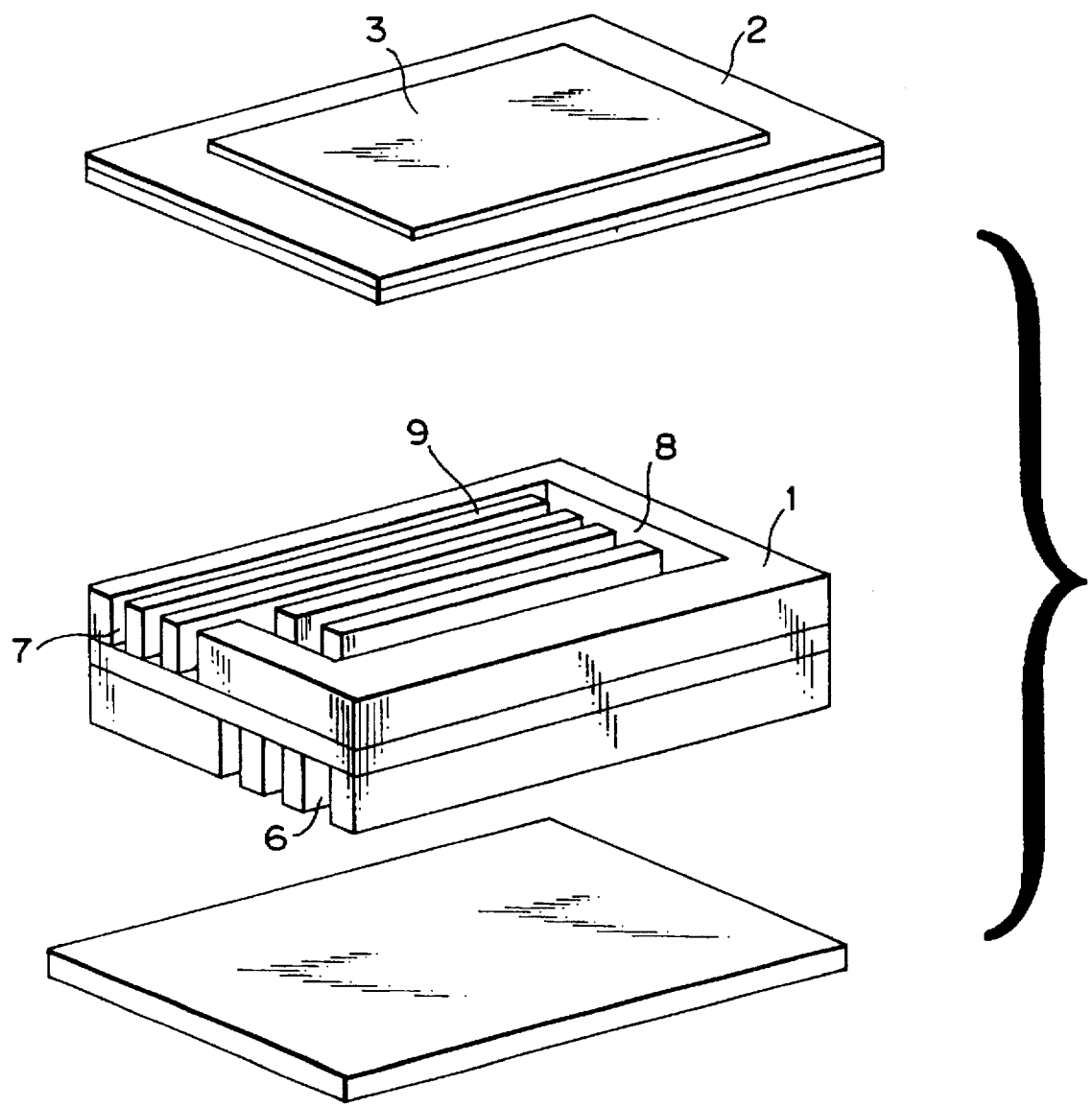
FIG. 6 is a schematic view showing a method of producing an electrode substrate of the present invention by a sheet lamination method.
Figure 7A:
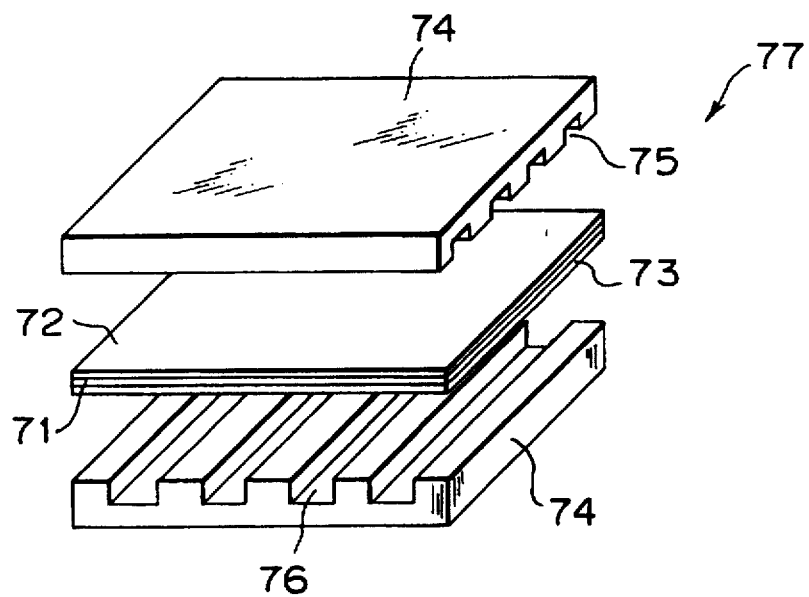
FIG. 7A is a schematic view showing the structure of a single cell of a prior art flat plate type fuel cell.
Figure 7B:
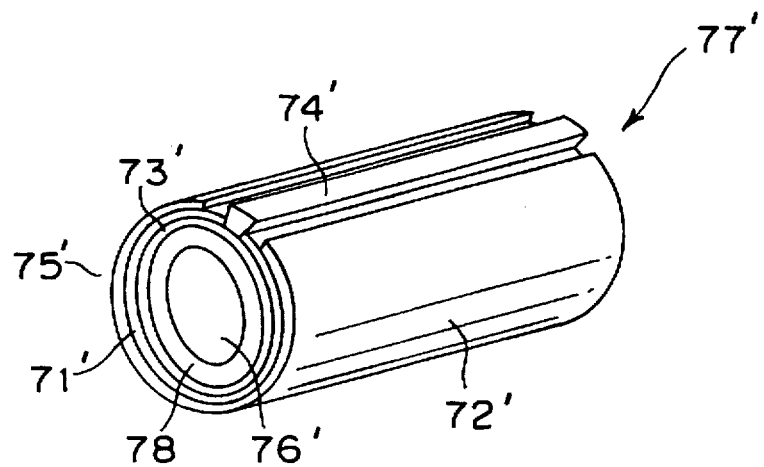
FIG. 7B is a schematic view showing the structure of a single cell of a prior art tubular type fuel cell.
Figure 7C:
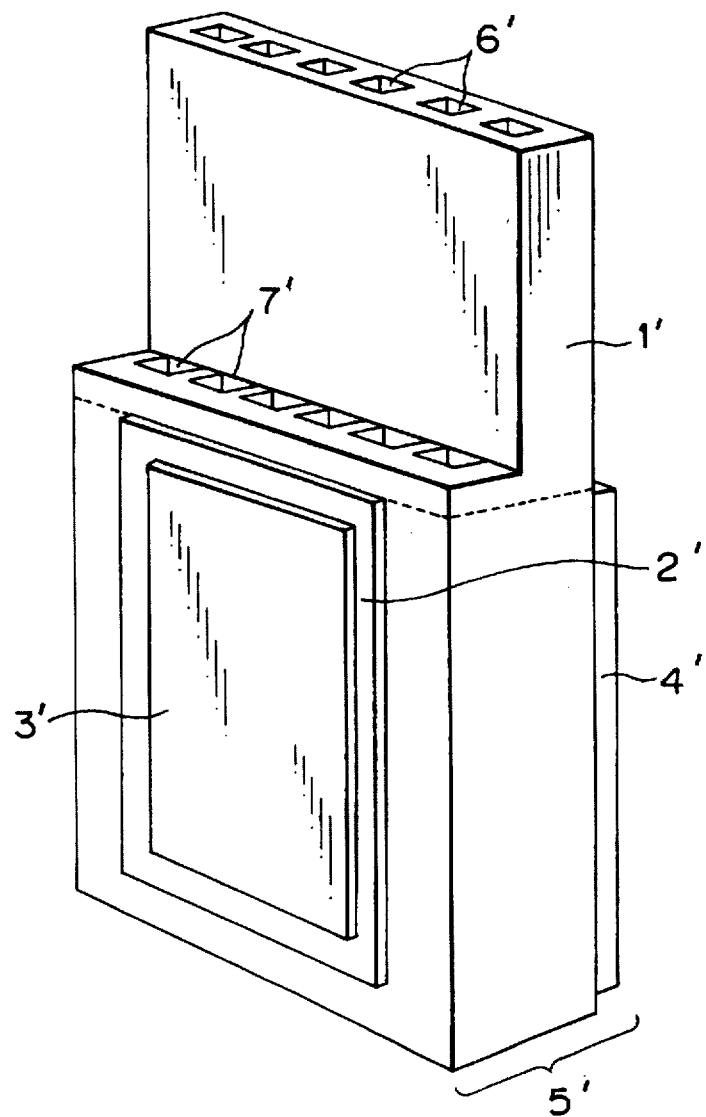
FIG. 7C is a schematic view showing the structure of a prior art hollow flat plate type fuel cell.

A method for producing the hollow substrate of the present invention by heat pressing of the sheets is schematically shown in FIG. 6. Such a pressed body of the sheets was burned out and then sintered to obtain a single cell comprising the substrate and the electrolyte and electrodes formed. The burn out and sintering conditions were almost the same as those for the extrusion molded body described above. Finally, an about 100 μm thick interconnector comprising $La_{0.9}Ca_{0.1}CrO_3$ was formed on the sintered body using the plasma spray apparatus shown above. Further, the side of the substrate with insufficient interconnector formation was coated with glass paste to ensure gas sealability of the substrate.

As described above, in the SOFC of the present invention, an electrode substrate is produced which has a structure having a plurality of passages for permeating the oxidant gas. A plurality of supply and return passages are formed within the substrate, and on the surface of the substrate are formed electrolyte and other electrodes to yield a cell. A plurality of cells are contacted in a face-to-face arrangement through conductors and encased in a shell to form a module.

Before the present invention, there were SOFCs represented by the flat plate type and the tubular type. However, in the flat plate type, it was difficult to reduce the cell resistance. Further, gas sealing was indispensable, and it was difficult to ensure gas sealability over an extended period of time where a glass-based sealing agent must be used. Further, there was a danger of damaging the cell during a temperature increase because a force may be generated and added to each single cell due to the softening temperature of the glass-based material. On the other hand, the tubular type has an advantage in that the cell strength is high since the power generation section is formed on the surface of the support, and the electrolyte can be substantially thin. However, to the contrary, as a problem coming from the cell shape, since the power generation current flows along the electrode layer, there is a large voltage drop in this portion, and a high power generation characteristic cannot be achieved.

Further, in addition to the above two methods, there is a known method which uses a hollow flat plate-formed porous electrode as a cell support. In a cell of this type, the cell support comprises a porous electrode having a conductivity, and it can be expected to have power generation characteristics superior to the tubular type. However, the electrode used as the support is provided with gas passages formed in two portions. Gas supplied to one of the portions is preheated during its passage therethrough and, after reversing direction at an innermost part of the support, reaches the gas passages just beneath the power generation section where the reaction is started. Although a longer dwell time in the supply passages is advantageous to achieve sufficient preheating, the supply passages and the return passages of this SOFC are the same in cross sectional shape, the flow rates of the supplied gas in the individual passages are the same, and therefore gas preheating is insufficient only in the supply passages. Preheating is continued even after passing through the portion where the gas flow direction is reversed and reaches the return passage where the power generation reaction is to be carried out. Therefore, the predetermined temperature is reached in the return passages, which results in a reduction in the area of the power generation section thereby effecting the power generation reaction. Consequently, there is a defect in that the power generation amount is decreased as a whole.

On the other hand, in the cell of the present invention, the two types of gas required for the reaction are completely separated between the inside and outside of the substrate until the reaction is completed, and because sealing is necessary for only one portion of the cell, the module can be assembled without gas leakage from the periphery of the cell as seen in the prior art flat plate type cell. Further, inside the module, the connection of the individual single cells is achieved by an elastic porous conductor. Therefore, the electrical connection between cells can be assured even if the degree of flatness is not high as required in the prior art cell, and the module can be easily assembled.

Further, in the present invention, a plurality of gas supply and discharge passages are provided in the hollow flat plate-formed porous electrode. To reduce the flow rate of the gas in the supply passages as compared to the gas flow rate in the return passages, the number of gas supply passages is greater than the number of gas return passages, or the gas supply passages are made larger in cross sectional area than the gas return passages. This allows sufficient preheating of the gas in the supply passages so that a sufficiently preheated gas can be supplied at the time it reverses direction in the return header and reaches the return passages. Yet further, by reducing the gas flow rate in the supply passage, part of the gas can be diffused in the porous sintered substrate and supplied to the return passages to generate power. This action in combination with the power generation reaction occurring at the return header enables a uniform power generation reaction and a uniform temperature distribution in the whole substrate and thereby preventing the substrate from being damaged by a thermal stress due to the temperature distribution. Yet further, by efficient gas preheating and partial gas supply by diffusion, a uniform power generation reaction over the entire substrate and an increased amount of generation can be achieved.

Still further, in the present invention, to promote such gas diffusion between the supply passages and the return passages, small holes communicating with the individual passages can be provided in the partition walls between the supply passages and return passages, and uniformization of power generation reaction by gas diffusion is possible even when the outer dimensions of the substrate are large and the flow passages are long.

Prior art flat plate type and tubular type SOFCs had a major disadvantage in that a cell itself which has sufficient power generation characteristics is difficult to achieve. However, in the present invention, as a result of the above-described cell structure, various problems of the prior art cell are eliminated, and an SOFC having high power generation characteristics can be achieved, which is very advantageous for the industry.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A solid oxide fuel cell comprising a substrate composed of a first electrode material, said substrate having first and second main surfaces and a third surface intersecting with and interposed between said first and second main surfaces, said substrate having therein a plurality of gas supply passages extending within said substrate and having inlet ports on said third surface of the substrate;

a plurality of gas return passages extending within said substrate substantially parallel to said gas supply passages and having outlet ports on said third surface of the substrate;

a header interposed between the gas supply and gas return passages, gas entering said header from said gas supply passages being changed in direction and directed into said gas return passages; and means to cause the gas flow from the supply passages to increase in speed;

a solid electrolyte formed on the first main surface of said substrate;

an electrode composed of a second electrode material formed on said solid electrolyte; and an interconnector formed on the second main surface of said substrate.

2. The solid oxide fuel cell claimed in claim 1 wherein said gas supply passages have a total cross sectional area which is greater than the total cross sectional area of said gas return passages.

3. The solid oxide fuel cell claimed in claim 1 wherein the number of gas supply passages is greater than the number of gas return passages.

4. The solid oxide fuel cell claimed in claim 3 wherein the total cross sectional area of the gas supply passages and the total cross sectional area of the gas return passages is substantially the same.

5. The solid oxide fuel cell claimed in claim 1 which further comprises a partition wall between a gas supply passage and a gas return passage, said partition wall having holes therein which permit diffusion of gas between said gas supply passage and said gas return passage.

6. The solid oxide fuel cell claimed in claim 1, wherein the first electrode material of which said substrate is composed is $(La_{1-x}Sr_x)MnO_3$, where x has a value selected from the group consisting of 0.1 and 0.2 the second electrode material of which said electrode is composed is nickel zirconia cermet, and said electrolyte is composed of a zirconium oxide doped with yttrium oxide.

7. A power generation module comprising a plurality of solid oxide fuel cells, each of said fuel cells including a substrate composed of a first electrode material, said substrate having first and second main surfaces and a third surface intersecting with and interposed between said first and second main surfaces, said substrate having therein a plurality of gas supply passages extending within said substrate and having inlet ports on said third surface of the substrate;

a plurality of gas return passages extending within said substrate substantially parallel to said gas supply passages and having outlet ports on said third surface of the substrate;

a header interposed between the gas supply and gas return passages, gas entering said header from said gas supply passages being changed in direction and directed into said gas return passages; and means to cause the gas flow from the supply passages to increase in speed;

a solid electrolyte formed on the first main surface of said substrate;

an electrode composed of a second electrode material formed on said solid electrolyte; and an interconnector formed on the second main surface of said substrate;

a plurality of gas permeable conductive spacers, a spacer being interposed between each of said solid oxide fuel cells; and a shell encasing said plurality of solid oxide fuel cells and said plurality of spacers, said shell having a gas supply chamber for supplying oxidant gas to said gas supply passages;

a discharge chamber for receiving oxidant gas from said gas return passages; and a power generation chamber having a fuel gas supplied thereto for interaction with said electrode.

8. The power generation module claimed in claim 7, wherein the first electrode material of which said substrate is composed is $(La_{1-x}Sr_x)MnO_3$, where x has a value selected from the group consisting of 0.1 and 0.2 the second electrode material of which said electrode is composed is nickel zirconia cermet, and said electrolyte is composed of a zirconium oxide doped with yttrium oxide.

9. A method of making a solid oxide fuel cell having a substrate with first and second opposing main surfaces, a third surface intersecting with and interposed between said first and second main surfaces, and a plurality of passages within said substrate having openings on said third surface; an interconnector; an electrolyte film and a fuel electrode film comprising the steps of mixing powders of $(La_{1-x}Sr_x)Mno_3$, where x has a value selected from the group consisting of 0.1 and 0.2 with additives;

extruding the mixed powders and additives in a die having substantially the same cross section as said substrate to produce an extruded body;

sintering said extruded body at a temperature in the range 1250° to 1350° C. to form the substrate;

forming the interconnector on the second main surface of said substrate by plasma spraying thereon $(La_{1-x}Ca_x)CrO_3$ where x has a value of 0.1;

forming the electrolyte film on the first main surface of said substrate by the electrochemical vapor deposition thereon of a composition of zirconium oxide and yttrium oxide; and forming the fuel electrode film on the electrolyte film by the electrochemical vapor deposition thereon of a slurry of nickel metal powder.

10. The method of making a solid oxide fuel cell claimed in claim 9 wherein said additives include a binder consisting essentially of a methyl cellulose type water-soluble polymer, a plasticizer and a solvent.

11. The method of making a solid oxide fuel cell claimed in claim 9 wherein said electrochemical vapor deposition formations of the electrolyte and fuel electrode films are carried out at a temperature of about 900° C. and a reaction pressure of one torr.

12. A method of making a solid oxide fuel cell having a substrate with first and second opposing main surfaces, a third surface intersecting with and interposed between said first and second main surfaces, and a plurality of passages within said substrate having openings on said third surface; an interconnector; an electrolyte film and a fuel electrode film comprising the steps of mixing powders of $(La_{1-x}Sr_x)MnO_3$, where x has a value selected from the group consisting of 0.1 and 0.2 a binder consisting essentially of polyvinyl butyral, a plasticizer of di-n-butyl phthlate, and a solvent consisting essentially of isopropyl alcohol to form a slurry;

agitating said slurry for between 24 and 48 hours;

deaerating said slurry to remove the solvent and adjust the viscosity;

doctor blading said slurry to form sheets; and heat pressing said sheets at a temperature of 70°–80°C. and 30–70 kg/cm$^2$ to produce a fused body of said sheets.

* * * * *